Patented Aug. 9, 1927.

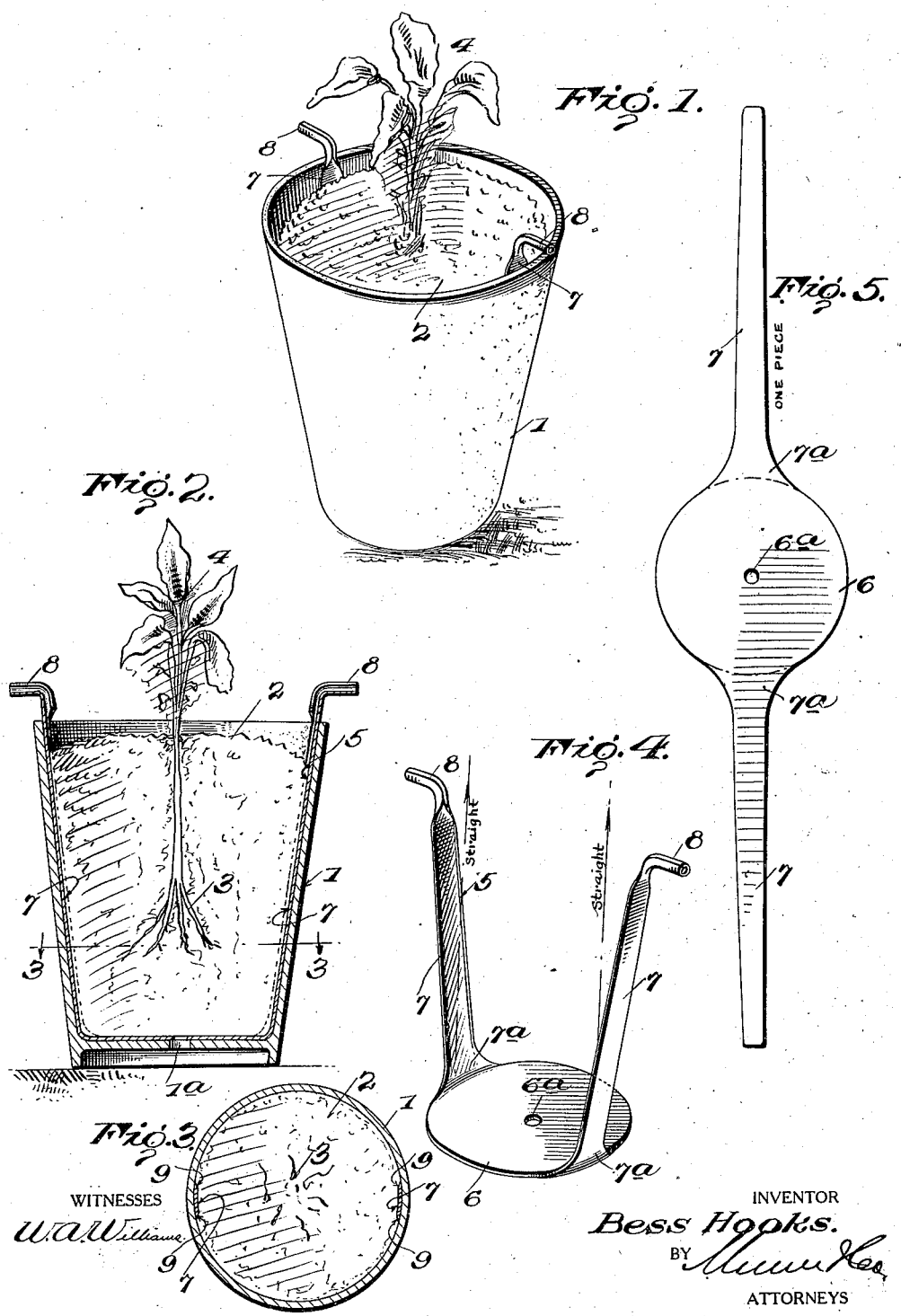

1,638,693

UNITED STATES PATENT OFFICE.

BESS HOOKS, OF THOMAS, OKLAHOMA.

TRANSPLANTING DEVICE.

Application filed September 16, 1926. Serial No. 135,917.

This invention relates to a transplanting device and is especially designed for use in removing plants, flowers, and the like from flower pots or containers without liability of injuring or damaging the roots or breaking up or disturbing the earth surrounding the roots. In addition to this advantage the device greatly facilitates the transferring operation, making the handling of the plant or flower together with its roots and the dirt surrounding the same easy and clean in that the dirt is not broken up and consequently liable to crumble and spill. The dirt surrounding the roots of the plant is maintained in compact form and protects the roots just as it did when the flower was in the pot.

A further object is to provide a transplanting device having these advantages and capacities and which is of simple and durable construction, reliable and effective in operation and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a perspective view showing a flower pot having a transplanting device embodying the present invention, associated therewith, Figure 2 is a view in transverse vertical section taken through the transplanting device and flower pot shown in Fig. 1, Figure 3 is a horizontal sectional view on the line 3—3 of Figure 2, Figure 4 is a detail perspective view of the transplanting device disassociated from a flower pot, and Figure 5 illustrates one form of blank from which the transplanting device may be formed.

Referring to the drawings and more particularly to Figs. 1 to 3 the numeral 1 designates generally a flower pot containing dirt or earth 2 in which the roots 3 of a plant or flower 4 are embedded or intertwined.

The present invention proposes the provision of a transplanting device, designated generally at 5, the transplanting device being positioned in the flower pot before the dirt is placed therein. As shown in detail in Figs. 4 and 5 the transplanting device comprises a bottom plate or base plate or supporting plate 6 which conforms in size and shape to the bottom of the flower pot. Centrally this bottom plate 6 has an opening $6^a$ which registers with the drain opening $1^a$ of the bottom of the flower pot when the transplanting device is positioned in the flower pot. Arms 7 are integrally formed with diametrically opposite portions of the plate 6, the arms 7 having the form of thin strips which are part of the same blank from which the bottom plate is cut or stamped, as shown to advantage in Fig. 5. The upper ends of the arms 7 have outturned extremities 8 which are rolled to provide tubular handle portions. The arms 7 are thin and relatively narrow and when the transplanting device is in the flower pot these arms 7 fit flush up against the inner wall of the body of the flower pot, as shown in Fig. 3, the arms 7 being transversely curved to conform to the curvature of the body of the flower pot. To strengthen the connection of the arms 7 with the plate 6 they are enlarged, as at $7^a$, at their juncture with the plate. At least one and preferably both side edges of the arms 7 are sharpened as clearly shown at 9 in Fig. 3, the sharpened edges providing cutters.

When the flower or plant is growing in the pot the transplanting device does not interfere in any way with the ordinary function of the flower pot. In fact, only a small portion of the arms 7 and the handle portions 8 are visible. When it is desired to transplant the flower or plant or to remove it from the flower pot for any reason the flower pot is held and the handles 8 are grasped and used to turn the transplanting device bodily within the pot. The cutting edges 9 at this time operate to affect separation of the periphery of the body of the dirt from the inner wall of the body of the flower pot. After a complete rotation has been affected an upward lift is exerted on the handle portions 8 and the entire body of the dirt will be easily removed from the pot, the body of the dirt resting on the bottom plate 6 of the transplanting device and being held thereon by the arms 7. As no portions of the body of the dirt are adhering to the flower pot in view of the operation of the cutters the dirt does not tend to break or crumble but maintains its compact form and may be easily handled and transferred or transplanted without spilling the dirt or damaging the roots. In view of the formation of the transplanting device from a single blank of metal or other suitable material, the transplanting device may be produced at a comparatively slight expense. As shown in Figs. 2 and 4 the arms 7 incline slightly outwardly as they extend upwardly, conforming in this respect to the tapered structure of the ordinary flower pot.

I claim:—

1. A transplanting device comprising a base plate adapted to fit on the bottom of a flower pot below the dirt and flower therein, arms extending upwardly from the base plate and adapted to fit snugly against the inner wall of the flower pot, the upper ends of the arms having handle portions, the edges of the arms being sharpened to provide cutters.

2. A transplanting device comprising a supporting plate adapted to engage and support the lower end of the dirt contained in a flower pot or the like and combined supporting arms and cutters extending upwardly from the supporting plate.

3. A transplanting device comprising a flat thin plate of a size and shape to conform to the bottom of a flower pot or the like and adapted to engage and support the dirt contained in the flower pot or the like, thin narrow arms integrally formed with the plate at diametrically opposite portions thereof, the arms inclining upwardly and outwardly and being transversely curved to snugly fit against the inner wall of the flower pot or the like, the edges of the arms being sharpened, the upper ends of the arms being extended laterally to provide handle portions.

BESS HOOKS.